United States Patent [19]

Nishita et al.

[11] 4,069,211

[45] Jan. 17, 1978

[54] AIR DRYING REACTION PRODUCT OF A DIISOCYANATE AND 1-METHYL-2-VINYL-4,6-HEPTADIENOL

[75] Inventors: Sadao Nishita, Tokyo; Satoru Enomoto, Fujisawa; Hisayuki Wada; Yutaka Mukaida, both of Tokyo; Mikiro Yanaka, Matsudo; Hitoshi Takita, Tokyo, all of Japan

[73] Assignee: Kureha Kagaku Kogyo Kabushiki Kaisha, Tokyo, Japan

[21] Appl. No.: 700,475

[22] Filed: June 28, 1976

[30] Foreign Application Priority Data

June 30, 1975 Japan .................................. 50-79978

[51] Int. Cl.² ............................................. C08G 18/04
[52] U.S. Cl. ................... 260/77.5 MA; 260/77.5 CR; 560/158; 526/312
[58] Field of Search ............... 526/312; 260/77.5 MA, 260/77.5 CR, 482 B

[56] References Cited

U.S. PATENT DOCUMENTS

| | | | |
|---|---|---|---|
| 3,448,171 | 6/1969 | Damusis | 260/77.5 CR |
| 3,784,524 | 1/1974 | Morgan | 260/77.5 MA |
| 3,862,920 | 1/1975 | Foster et al. | 260/77.5 MA |

*Primary Examiner*—Eugene C. Rzucidlo
*Attorney, Agent, or Firm*—Lane, Aitken, Dunner, & Ziems

[57] ABSTRACT

A composition including a diisocyanate and 1-methyl-2-vinyl-4,6-heptadienol. This composition is capable of curing in air at room temperature after aging in a dry nitrogen atmosphere.

7 Claims, 1 Drawing Figure

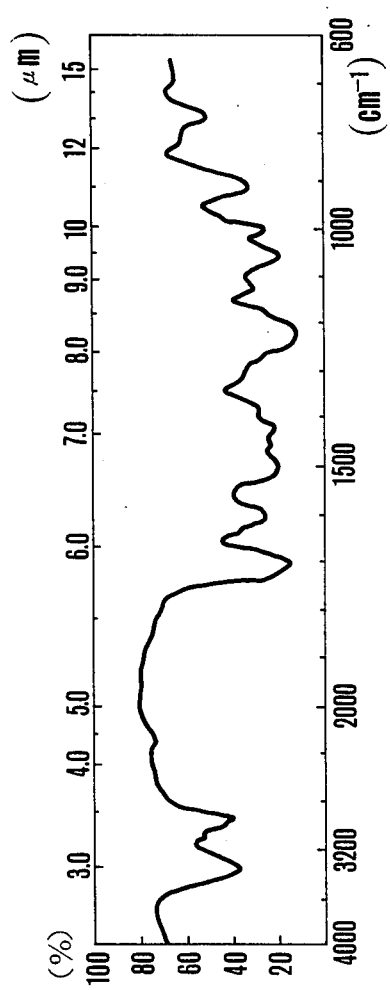

AIR DRYING REACTION PRODUCT OF A DIISOCYANATE AND 1-METHYL-2-VINYL-4,6-HEPTADIENOL

FIELD OF THE INVENTION

This invention relates to an air drying material useful as a paint, adhesive, sealant, caulking agent, vehicle for printing ink or other similar applications. The material is novel and cures in air at room temperature.

BACKGROUND OF THE INVENTION

Heretofore, an air drying type alkyd resin modified with an aliphatic acid has been used in large quantities as paint, adhesive, sealant, caulking agent, vehicle for printing ink or the like. However, when an alkyd resin is used for these applications, a solvent acting as a thinner must be used with the resin to increase its workablity. A solvent is only required at the time of use of the alkyd resin. After application the solvent dissipates into the atmosphere. From the stand-point of air pollution control, safety for workers and saving of resources, therefore, the use of a solvent is not always desirable.

SUMMARY OF THE INVENTION

An object of the present invention is, therefore, to provide a novel air drying material which can be applied for the applications mentioned above without using a solvent.

This object and the other objects of the present invention will become apparent from the following description.

It has now been discovered that the material obtained by mixing a diisocyanate compound with 1-methyl-2-vinyl-4,6-heptadienol and by then ageing the mixture is satisfactorily capable of curing in air at room temperature.

According to the present invention, there is provided an air drying type material formed by reacting a diisocyanate compound and 1-methyl-2-vinyl-4,6-heptadienol of the formula:

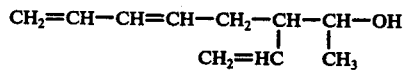

BRIEF DESCRIPTION OF THE DRAWING

The accompanying drawing represents an infrared absorption spectrum of the viscous material obtained when a 1 mole of 1-methyl-2-vinyl-4,6-heptadienol is mixed with 0.5 mole of tolylene-2,4-diisocyanate and is stirred in a dry nitrogen atmosphere at room temperature for ten hours.

DETAILED DESCRIPTION OF THE INVENTION

The 1-methyl-2-vinyl-4,6-heptadienol used in the present invention is produced by reacting butadiene with an aldehyde in the presence of a palladium complex catalyst. The 1-methyl-2-vinyl-4,6-heptadienol is a transparent liquid having a boiling point of 60° – 66° C/2 mmHg and has been disclosed in pages 3813 to 3816 of "Tetrahedron Letters" No. 43 (England, 1970). Further, this compound is highly reactive since it has a conjugated double band and a vinyl substituent in its molecule.

The diisocyanate compound used in the present invention may be an aliphatic compound, an aromatic compound or a prepolymer. The diisocyanate compounds satisfying the purpose of this invention include tolylene diisocyanate, a mixture of 2,4-tolylene diisocyanate with 2,6-tolylene diisocyanate, hexamethylene diisocyanate, 4,4'-diphenylmethane diisocyanate, 1,5-naphthalene diisocyanate, phenylene diisocyanate, octamethylene diisocyanate and a dimer of tolylene diisocyanate, for example. The diisocyanate compound may be an adduct of a diisocyanate compound and a polyhydroxy-compound having two or more hydroxyl groups, such as the adduct of trimethylol propane and tolylene diisocyanate. Examples of the prepolymers are polyarylene polyisocyanate; a polyhydroxy-compound having isocyanate groups in the terminal positions thereof which is obtained by reacting a diisocyanate compound with a polyglycol; and a prepolymer obtained by reacting a diisocyanate compound with a polyester having amino groups, a polyether or a polyamide.

The of the present invention is composed of the diisocyanate compound and the 1-methyl-2-vinyl-4,6-heptadienol. The former may be used in an amount of 0.2 to 2 moles, preferably 0.4 to 0.8 mole per 1 mole of the latter. The composition is used after ageing to a suitable viscosity by simply leaving it under a dry nitrogen atmosphere at room temperature for 1-24 hours or by maintaining it under a dry nitrogen atmosphere at 40°-80° C for 0.5 to 5 hours. The composition of the present invention thus aged can cure in air at room temperature. When the composition cures, it is believed that the isocyanate group reacts with 1-methyl-2-vinyl-4,6-heptadienol to form urethane bonds and biuret bonds.

The composition thus aged may be also used with an alkyd resin and consequently the alkyd resin can be employed without using the solvent such as a thinner. If necessary, a curing catalyst such as cobalt naphthenate or lead naphthenate and an additive such as a pigment or filler, which are usually added to the alkyd resin may be added to the aged composition of the present invention.

The present invention will be described below more specifically with reference to the preferred embodiments; however, it is not limited to these examples.

EXAMPLE 1

1 mole of 1-methyl-2-vinyl-4,6-heptadienol was mixed with 0.5 mole of tolylene 2,4-diisocyanate. The resultant mixture was stirred under a dry nitrogen atmosphere at room temperature for 10 hours to age and thereby form a viscous material. The infrared absorption spectrum of this material was then measured. The spectrum revealed that the absorption range of "—C=O" was present at 1700 cm$^{-1}$. The spectrum is shown in the accompanying drawing. In the drawing, the vertical axis represents percent transmission and the upper horizontal axis shows wave length (micron) and the lower horizontal axis shows frequency (cm$^{-1}$).

The material was coated on a glass plate and the film was left in air at room temperature for 8 hours. The film cured perfectly.

EXAMPLES 2-5

The viscous material was prepared by using crude tolylene diisocyanate (TDI) of accordance with the same procedure in Example 1. In these examples, the mol ratio of TDI to 1-methyl-2-vinyl-4,6-heptadienol and the reaction conditions were varied. 50 parts of these resultant viscous materials were blended with 25 parts of titanium oxide, 5 parts of zinc oxide and 20 parts of calcium carbonate to prepare various paints. A week after coating with these paints, the film properties were measured. The resins used, the composition of and the characteristics of the paints are listed in Table 1 below.

As apparent from Table 1, the film properties obtained by using the composition of the present invention are comparable to conventional products and particularly excellent in hardness.

according to the same procedure used in Example 2. The results were listed in Table 2 below.

EXAMPLE 8

30 g of 1-methyl-2-vinyl-4,6-heptadienol was mixed with 100 g of Sunprene FLR 15 (urethane prepolymer produced by Sanyo Kasei Co., Ltd.; containing 7.5% by weight of isocyanate). The resultant mixture was tested according to the same procedure used in Example 2. The results are shown in Table 2 below.

Table 1

| Reaction condition | Example 2 | Example 3 | Example 4 | Example 5 | Comparative Example |
|---|---|---|---|---|---|
| 1-methyl-2-vinyl-4,6-heptadienol (mol) | 1 | 1 | 1 | 1 | |
| Crude TDI (*1) (mol) | 1 | 0.3 | 1 | 0.5 | |
| Temperature (° C) | 40 | 60 | room temperature | | |
| Time (time) | 2 | 3 | 0.5 | 0.5 | |
| Composition of Paint | | | | | |
| Reaction product (part by weight) | 50 | 50 | 20 | 32 | — |
| Alkyd resin (*2) (part by weight) | — | — | 30 | 18 | 50 |
| 5% cobalt naphthenate (part by weight) | — | — | 0.68 | 0.68 | 0.68 |
| Thinner (part by weight) | — | — | — | — | 25 |
| Titanium oxide (part by weight) | 25 | 25 | 25 | 25 | 25 |
| Zinc oxide (part by weight) | 5 | 5 | 5 | 5 | 5 |
| Calcium carbonate (part by weight) | 20 | 20 | 20 | 20 | 20 |
| Characteristics | | | | | |
| Curing velocity at 25° C | | | | | |
| set to touch (hour) | 3.0 | 3.0 | 2.5 | 4.0 | 0.5 |
| dust free (hour) | 5-6 | 5-6 | 5 | 6.5 | 3 |
| dry to handle (hour) | 8 | 8 | 8 | 8 | 6 |
| Film properties (*3) | | | | | |
| Pencil hardness | 3 H | 2 H | 3 H | 2 H | H |
| Bending resistance mm (Mandrel) | 4 | 3 | 4 | 2 | 2 |
| Cross cut test | 100/100 | 100/100 | 100/100 | 100/100 | 100/100 |
| Impact resistance kg-cm (Dupont system) | 0.3-40 | 0.5-50 | 0.4-50 | 0.5-50 | 0.5-50 |

Note: (*1) A mixture of

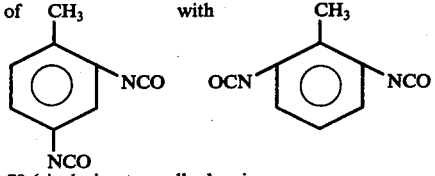

(*2) Beckosol P470-70 (air drying type alkyd resin produced by Nippon Reichhold Co., Ltd.; containing soya-bean oil and 24 % of phthalic acid; oil length 70).
(*3) The measurements were in accordance with the testing method of JIS K-5400.

EXAMPLE 6

13 g of 1-methyl-2-vinyl-4,6-heptadienol was mixed with 100 g of Hi-prene P302 (urethane prepolymer produced by Mitsui-Toatsu Co., Ltd.; containing 3.2% by weight of isocyanate). The resultant mixture was stirred under a dry nitrogen atmosphere at 50° C for 3 hours to form a viscous material. A paint was formulated using the resultant material by the same procedure of Example 2. Then, the film properties were measured. The results are listed in Table 2 below.

EXAMPLE 7

20 g of 1-methyl-2-vinyl-4,6-heptadienol was mixed with 100 g of Sunprene SEL 11 (urethane prepolymer produced by Sanyo Kasei Co., Ltd.; containing 5.1% by weight of isocyanate). The resultant mixture was tested Table 2

| Characteristics | EXAMPLE 6 | EXAMPLE 7 | EXAMPLE 8 |
|---|---|---|---|
| Curing velocity at 25° C | | | |
| Set to touth (hour) | 3.0 | 2.5 | 1.5 |
| dust free (hour) | 5-6 | 5-6 | 5-6 |
| dry to handle (hour) | 10 | 8 | 8 |
| Film properties | | | |
| Pencil hardness | 3 B | 2 B | 2 B |
| Bending resistance mm (mandrel) | 2 | 2 | 2 |
| Cross cut test | 100/100 | 100/100 | 100/100 |
| Impact resistance kg-cm (Dupont system) | 0.5-50 | 0.5-50 | 0.5-40 |

What is claimed is:
1. An air drying reaction product formed by admixing a diisocyanate compound and 1-methyl-2-vinyl-4,6-heptadienol of the formula

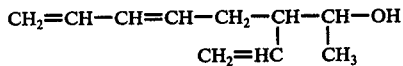

and aging the resultant reaction product in a dry nitrogen atmosphere.

2. The reaction product of claim 1, wherein said diisocyanate is present in said reaction product in the amount of 0.2 to 2 moles per mole of said 1-methyl-2-vinyl-4,6-heptadienol.

3. The reaction product of claim 1, wherein said diisocyanate compound is tolylene diisocyanate, a mixture of 2,4-tolylene diisocyanate with 2,6-tolylene diisocyanate, hexamethylene diisocyanate, 4,4'-diphenylmethane diisocyanate, 1,5-naphthalene diisocyanate, phenylene diisocyanate, octamethylene diisocyanate or a dimer of tolylene diisocyanate.

4. The reaction product of claim 1, wherein said diisocyanate is an adduct of a diisocyanate and a polyhydroxy-compound having two or more hydroxyl groups.

5. The reaction product of claim 4, wherein said adduct is the adduct of trimethylol propane and tolylene diisocyanate.

6. The reaction product of claim 1, wherein said diisocyanate is a polyarylene polyisocyanate; an isocyanate-terminated polyhydroxy-compound or a prepolymer obtained by reacting a disocyanate compound with a polyester having amino groups, a polyether or a polyamide.

7. The reaction product of claim 1, wherein said ageing is by leaving said mixture in a dry nitrogen atmosphere at room temperature for 1–24 hours or by maintaining said mixture in a dry nitrogen atmosphere at 40°–80° C for 0.5 to 5 hours.

* * * * *